United States Patent
Koste et al.

(10) Patent No.: US 10,718,990 B2
(45) Date of Patent: Jul. 21, 2020

(54) INTEGRATED ENTANGLED PHOTON SOURCE

(71) Applicant: General Electric Company, Schenectady, NY (US)

(72) Inventors: Glen Peter Koste, Niskayuna, NY (US); Adam Halverson, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/228,056

(22) Filed: Dec. 20, 2018

(65) Prior Publication Data
US 2020/0201137 A1 Jun. 25, 2020

(51) Int. Cl.
*G02F 1/35* (2006.01)
*G02F 1/39* (2006.01)

(52) U.S. Cl.
CPC .......... *G02F 1/3501* (2013.01); *G02F 1/3536* (2013.01); *G02F 1/39* (2013.01); *G02F 2001/3503* (2013.01); *G02F 2201/06* (2013.01)

(58) Field of Classification Search
CPC ........ G02F 1/3501; G02F 1/3536; G02F 1/39; G02F 2001/3503; G02F 2201/06
See application file for complete search history.

(56) References Cited

U.S. PATENT DOCUMENTS 8,380,016 B1 * 2/2013 Hochberg ............. G02F 1/2257
385/131
9,778,543 B1 * 10/2017 Zlatanovic ............. G02F 1/395

FOREIGN PATENT DOCUMENTS

WO 2017/213768 A1 12/2017

* cited by examiner

*Primary Examiner* — Ryan A Lepisto
(74) *Attorney, Agent, or Firm* — Buckley, Maschoff & Talwalkar LLC

(57) ABSTRACT

A photonic circuit integrated on a silicon-on-insulator waveguide, the silicon-on-insulator waveguide including a guiding layer, a cladding layer, and a substrate layer. The guiding layer having a first surface and a second surface, the second surface abutting one surface of the cladding layer, the cladding layer having another surface in abutment with a surface of the substrate layer, a photon pump in optical communication with the guiding layer, a nonlinear optical material in contact with the guiding layer first surface, a photon beam of the photon pump traversing the silicon-on-insulator waveguide, and the silicon-on-insulator waveguide having an output beam that includes a signal beam and an idler beam.

18 Claims, 3 Drawing Sheets

US 10,718,990 B2

INTEGRATED ENTANGLED PHOTON SOURCE

BACKGROUND

Entanglement is a property of quantum mechanical systems, where when two particles are entangled the measurement of the properties of one of the two allows the properties of the other to be instantaneously known, independent of any distance separating them. Semiconductor materials exhibit a huge potential for integrating several quantum components in miniature chips.

Computing engineers can apply these components to use photonic qubits to obtain high-fidelity quantum states that are relatively robust to outside interference. Photonic qubits can be used to realize high-efficiency single qubit gates/operations. However, conventional techniques generate the photonic qubits stochastically. Synchronizing multiple photonic qubits (as is needed for quantities of quantum gates) can be very difficult. Consequently, multi-qubit photonic gates can have very low efficiency. Conventional approaches to generating photonic qubits does not scale well for operations that require an ever increasing number of photonic qubits.

DESCRIPTION

Embodying systems provide an integrated photonic circuit that can enable a step change in cost, reliability, and size for quantum computing and networking systems. In accordance with embodiments, an integrated photonic circuit is a source of entangled photons that includes a photo-lithographically defined waveguide in proximity to an evanescently-coupled, nonlinear optical material positioned (for example) adjacent to, or in-line with, the waveguide.

An embodying integrated photonic circuit can be used as a photon source for the synchronized generation and coordinated use of photonic qubits. Systems incorporating an embodying photonic circuit can greatly increase the use of photonic qubits in both quantum computing and quantum cryptography technologies.

An embodying integrated photonic circuit can generate entangled photons in fiber optic or free-space systems without the conventional need for non-integrated collimating lenses and collection optics when a photon pump is focused on a nonlinear crystal. An embodying integrated photonic circuit can be produced for lower cost by integrating a photon source (e.g., a spontaneous parametric down-conversion (SPDC) source, a spontaneous four wave mixing (SFWM) source, or the like). Entangled photon pairs can be generated in nonlinear materials such as potassium niobate ($KNbO_3$), lithium iodate ($LiIO_3$), lithium niobate ($LiNbO_3$), $\beta$-$BaB_2O_4$ (BBO), and others.

In accordance with embodiments, the nonlinear material is introduced adjacent to a waveguide. In an embodying device, a photon pump generates a photon beam where the beam's evanescent fields propagate partially in the nonlinear material, while continuing to be guided in the silicon waveguide—as long as combined waveguide plus nonlinear material ensures guiding and that the nonlinear material can be placed close enough to the waveguide. The effective index of the combined waveguide and nonlinear material can be adjusted by selecting a proper waveguide geometry, allowing for longer interaction lengths for nonlinear mixing.

Figure 1A:
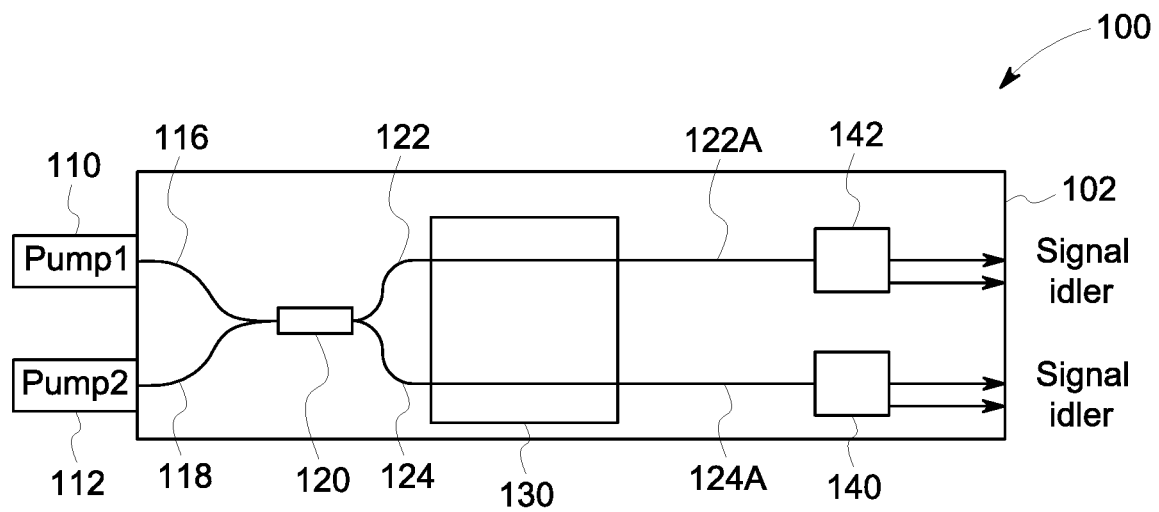
FIG. 1A schematically illustrates a top view of an integrated photonic circuit in accordance with embodiments.
Figure 2:
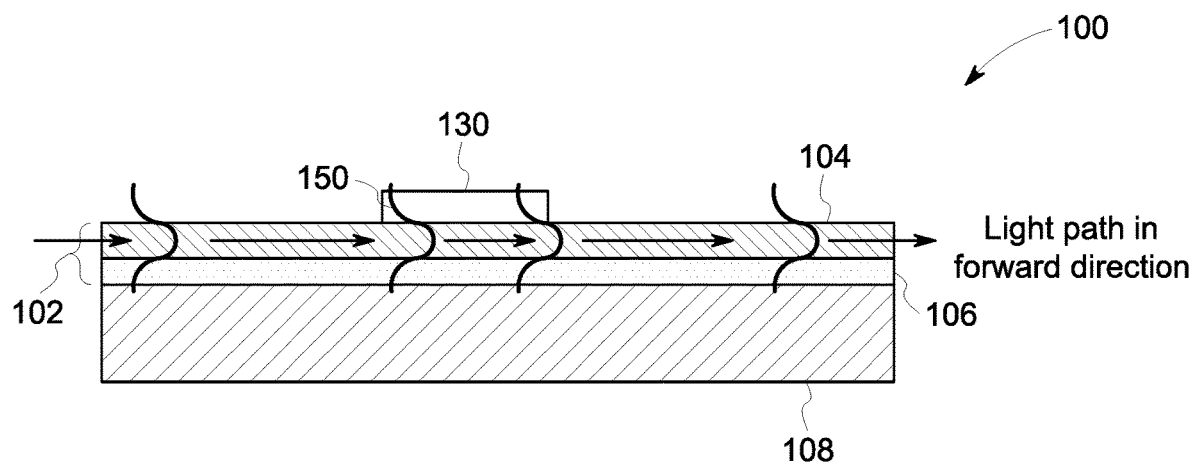
FIG. 2 schematically illustrates a partial side view of the integrated photonic circuit of FIG. 1 in accordance with embodiments.

FIG. 1A schematically illustrates a top view of integrated photonic circuit 100 in accordance with embodiments. FIG. 2 illustrates a partial side view of integrated photon circuit 100. The circuit is built on silicon-on-insulator (SOI) waveguide 102. The silicon-on-insulator optical waveguide could be alternatively be built out of silicon, silicon nitride, silica, indium phosphide or any other suitable waveguide material with an under cladding layer 106. The SOI waveguide includes guiding layer 104 cladding layer 106, and substrate layer 108. In some implementations, cladding layer 106 could also act as substrate layer 108, thus eliminating the need for two separate layers.

In accordance with embodiments, one or more photon pump sources 110, 112 are in optical communication with guiding layer 104. The photon beam outputs of the pumps can be provided to coupler 120 via on-chip waveguides 116, 118. The coupler can be a multi-mode interference coupler, a waveguide coupler, and the like. The coupler output can be bifurcated into two beams guided in waveguides 122, 124, each of which contains photons from both pump sources.

In accordance with embodiments, nonlinear optical material 130 can be deposited, or placed, on a portion of the guiding layer surface 104. The nonlinear optical material can be deposited, or placed, at any desired position to be in contact with the waveguide for a predetermined distance.

As photon beams in waveguides 122, 124 enter and propagate along the region of the guiding layer 104 that is adjacent to nonlinear optical material 130, the evanescent field 150 of each photon beam 122, 124 extends into the optical material. The nonlinear response of the optical material's dielectric polarization to the photon beam's electric field creates entangled photons in the beams traveling in the combination of waveguide and nonlinear optical material. Each entangled photon beam exits the interaction region and enters one of the output waveguides 122A, 124A The entangled photons are denoted as signal beam and idler beam.

Prior to exiting integrated photon circuit 100, in some implementations filter 140, 142 can be optionally introduced into the propagation path of entangled photon beam 122A, 124A. The filters can separate the pump, signal and idler, delivering entangled photon pairs to separate output ports of the integrated circuit.

Figure 1B:
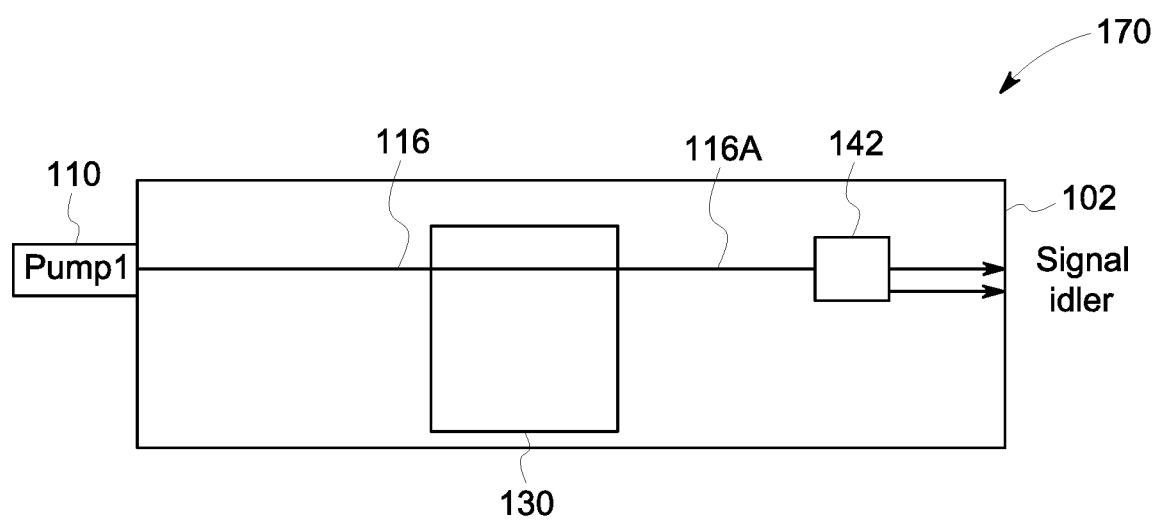
FIG. 1B schematically illustrates a top view of an integrated photonic circuit in accordance with embodiments.

FIG. 1B schematically illustrates the top view of integrated photonic circuit 170 in accordance with another embodiment. Integrated photonic circuit 170 includes a single pump source for use in an SPDC configuration. The pump source provides a single photon beam to waveguide 116. The photon beam then propagates along the region of the guiding layer 104 that is adjacent to nonlinear optical material 130, the evanescent field 150 of photon beam 116 extends into the optical material. The nonlinear response of the optical material's dielectric polarization to the photon beam's electric field creates entangled photons in the beams traveling in the combination of waveguide and nonlinear optical material. The entangled photon beam exits the interaction region and enters output waveguide 116A.

Figure 3:
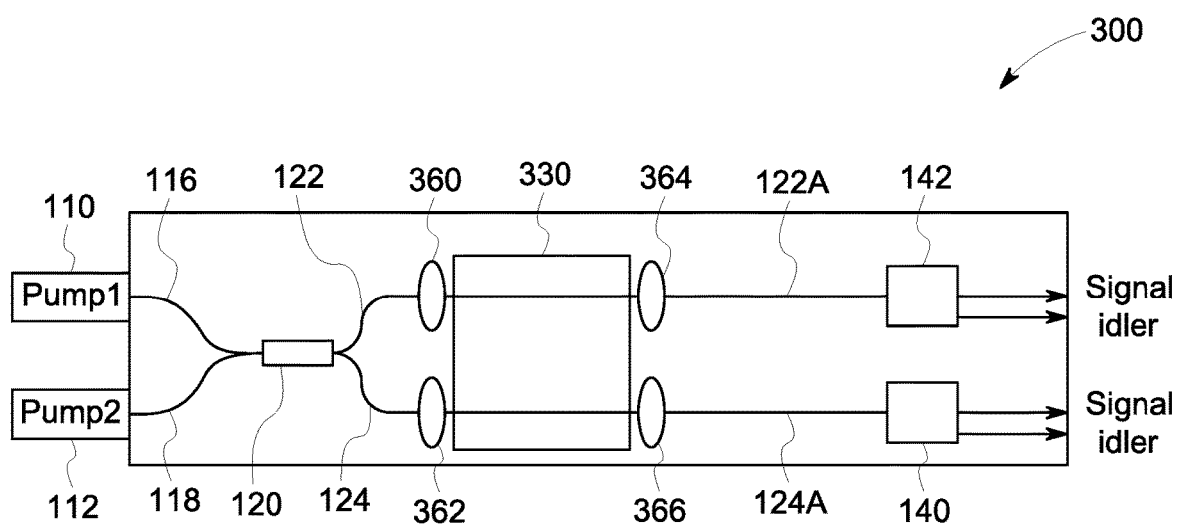
FIG. 3 schematically illustrates a top view of an integrated photonic circuit in accordance with embodiments.
Figure 4:
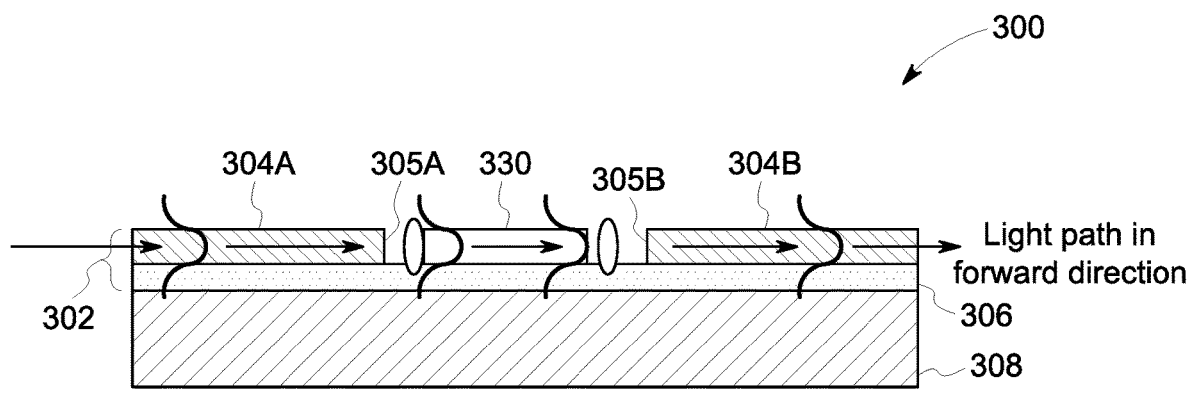
FIG. 4 schematically illustrates a partial side view of the integrated photonic circuit of FIG. 3 in accordance with embodiments.

FIG. 3 schematically illustrates a top view of integrated photon circuit 300 in accordance with embodiments. FIG. 4 illustrates a partial side view of integrated photon circuit 300. The circuit is built on silicon-on-insulator (SOI) waveguide 302. The SOI waveguide includes a first guiding layer 304A, a second guiding layer 304B, cladding layer 306, and substrate layer 308. In accordance with embodiments, one or more photon pumps 110, 112 are in optical communication with guiding layer 304A. The photon beam outputs of the pumps can be provided to coupler 120 via on-chip waveguides 116, 118. The coupler can be a multi-mode interference coupler, a waveguide coupler, and the like. The coupler output can be bifurcated into two beams in waveguides 122, 124.

In accordance with embodiments, nonlinear optical material 130 can be deposited or placed on cladding layer 306 within a trench defined by wall 305A, 305B of guiding layer 304A, 304B.

As photon beams in waveguides 122, 124 propagate, they exit guiding layer 304A and pass through collimating lens 360, 362 to enter nonlinear optical material 330. The nonlinear response of the optical material's dielectric polarization to the photon beam's electric field creates entangled photon in the nonlinear optical material 330. The entangled photons are denoted as signal beam and idler beam. Entangled photons from the nonlinear optical material 330 pass through collimating lens 364, 366 after exiting the nonlinear optical material to enter guiding layer 304B and waveguides 122A, 124A.

Prior to exiting integrated photon circuit 300, in some implementations filter 140, 142 can be optionally introduced into the propagation path of entangled photon beam 122A, 124B. The filters can separate the signal and idler, delivering entangled photon pairs to separate output ports of the integrated circuit. The filters can also block the pump light from output ports.

Figure 5:
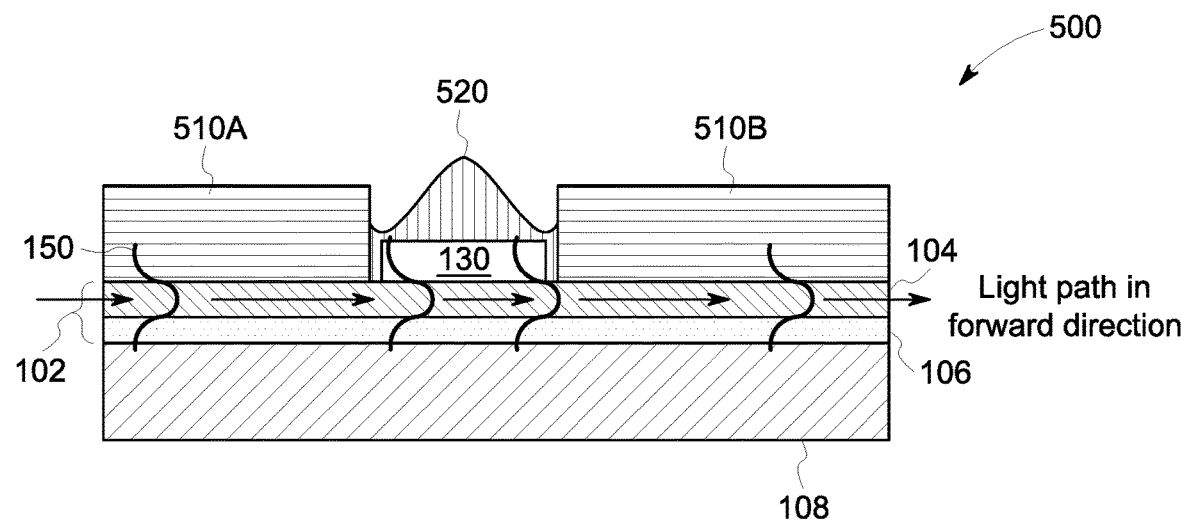
FIG. 5 schematically illustrates a top view of an integrated photonic circuit in accordance with embodiments.

FIG. 5 schematically illustrates a side view of integrated photonic circuit 500 in accordance with embodiments. In accordance with embodiments, waveguide structure 102 can include top cladding layer 510A, 510B with a trench etched down to the guiding layer 104. The nonlinear material 130 can be placed into the trench so as to be in contact with the guiding layer 104. In some implementations, optical adhesive material 520 can be placed into the trench to secure the nonlinear material 130. The presence of optical adhesive material 520 can improve the coupling efficiency of the light into, and out of, the nonlinear material by increasing the index of refraction in the gaps between the nonlinear material 130 and the top cladding layer 510A, 510B.

As disclosed above, illuminating the nonlinear optical material with a photon pump beam creates two beams of entangled photons, denoted as signal and idler. SPDC arises from a second-order optical nonlinearity, characterized by optical material's electric susceptibility χ(2) coefficient. For SPDC (typically single pump source), the pump beam frequency is the sum of the frequencies of the signal and idler beams:

$$\omega_{signal}+\omega_{idler}=\omega_{pump} \quad (EQ. 1)$$

For SFWM sources, two pump photons are used to create an entangled photon pair. SFWM arises from a third-order optical nonlinearity, characterized by a material's χ(3) coefficient, the third order term of the electric susceptibility. For SFWM (typically dual pump sources), the frequencies of the pump, signal, and idler beams obey these relationships:

$$\omega_{signal}+\omega_{idler}=\omega_{pump1}+\omega_{pump1} \quad (EQ. 2)$$

Note that in SFWM, the signal beam and idler beam frequencies can be identical with appropriately chosen pump frequencies (degenerate).

Conventional approaches route a photon beam generated by a discrete photon source into the nonlinear material. The conventional approach then gathers the output photons by using bulky optical elements, which are costly to align. An embodying integrated photonic circuit eliminates the conventional need for discrete photon pumps, bulk optics and precise alignment with nonlinear materials. In accordance with embodiments, a photon pump beam is evanescently coupled into nonlinear material, where both the pump and nonlinear material are located on an integrated substrate.

In accordance with embodiments, the effective index and group velocity of the mode traveling through the integrated photonic circuit can be tuned by selection of SOI waveguide layer materials in combination with selection of nonlinear optical materials. Tuning can also be achieved by changing the cross-sectional dimensions of the SOI waveguide, the nonlinear optical material, or both.

In accordance with embodiments, configuring a curved waveguide, a ring resonator structure, or a grating cavity under the nonlinear material can improve the efficiency of the integrated photon circuit. Higher efficiency results in reduced pump power requirements to generate the same number of entangled photons.

Although specific hardware has been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A photonic circuit comprising:
    an optical waveguide having a guiding layer and a first top cladding layer and a second top cladding layer, the first and second top cladding layer separated by a trench;
    the guiding layer having a first surface and a second surface, the second surface abutting one surface of the cladding layer;
    a photon pump in optical communication with the guiding layer;
    a nonlinear optical material positioned in the trench;
    the photon pump configured to generate a photon beam to traverse the optical waveguide; and
    the optical waveguide having an output beam that includes a signal beam and an idler beam.

2. The photonic circuit of claim 1, where the guiding layer is silicon and the first top and the second top cladding layers are silicon dioxide in a silicon on insulator structure.

3. The photonic circuit of claim 1, including the nonlinear optical material positioned in a direction orthogonal to the photon beam traversal.

4. The photonic circuit of claim 1, including a filter introduced into a propagation path of the photon beam at a location distal from the nonlinear optical material.

5. The photonic circuit of claim 1, including a coupler located between the photon pump and the nonlinear optical material.

6. The photonic circuit of claim 1, including the photon pump being a single pump configured to act as a spontaneous parametric down-conversion source.

7. The photonic circuit of claim 1, including the photon pump being two pumps configured to act as a spontaneous four wave mixing source.

8. The photonic circuit of claim 1, including a curved waveguide, a ring resonator structure, or a grating cavity located within the optical waveguide in a region under the nonlinear optical material.

9. The photonic circuit of claim 1, including an optical adhesive material in contact with at least a surface of the nonlinear material.

10. A photonic circuit comprising:
- an optical waveguide having a guiding layer and a cladding layer, the guiding layer having a first portion and a second portion;
- the first portion and the second portion of the guiding layer each having a respective first surface and a respective second surface, the respective second surfaces abutting a same surface of the cladding layer;
- the first portion in optical communication with a photon pump;
- the guiding layer first surface being about perpendicular to the guiding layer second surface, the first surface defining a first wall;
- the guiding layer second portion positioned distal from the first wall by a predetermined distance;
- the guiding layer second portion having a second wall, the second wall on a surface of the second portion opposite the first portion;
- the first wall and the second wall defining a trench;
- a nonlinear optical material positioned within the trench;
- the photon pump configured to generate a photon beam to traverse the optical waveguide; and
- the optical waveguide having an output beam that includes a signal beam and an idler beam.

11. The photonic circuit of claim 10, including the trench extending laterally across the optical waveguide in a direction orthogonal to the photon beam traversal.

12. The photonic circuit of claim 10, including a collimating lens positioned in a propagation path of the photon beam between the nonlinear optical material and at least one of the first portion and the second portion.

13. The photonic circuit of claim 10, where the guiding layer is silicon and the cladding layer is silicon dioxide in a silicon on insulator structure.

14. The photonic circuit of claim 10, including a filter introduced into a propagation path of the photon beam at a location distal from the nonlinear optical material.

15. The photonic circuit of claim 10, including a coupler located between the photon pump and the nonlinear optical material.

16. The photonic circuit of claim 10, including the photon pump being a single pump configured to act as a spontaneous parametric down-conversion source.

17. The photonic circuit of claim 10, including the photon pump being two pumps configured to act as a spontaneous four wave mixing source.

18. The photonic circuit of claim 10, including a curved waveguide, a ring resonator structure, or a grating cavity located within the optical waveguide in a region under the nonlinear optical material.

\* \* \* \* \*